(12) United States Patent
Shaw et al.

(10) Patent No.: US 6,445,861 B1
(45) Date of Patent: Sep. 3, 2002

(54) SOL-GEL PROCESSING TO FORM DOPED SOL-GEL MONOLITHS INSIDE HOLLOW CORE OPTICAL FIBER AND SOL-GEL CORE FIBER DEVICES MADE THEREBY

(75) Inventors: Harry C. Shaw, Bel Air; Melanie N. Ott, Columbia, both of MD (US); Michele V. Manuel, Gainesville, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 32 days.

(21) Appl. No.: 09/640,654

(22) Filed: Aug. 18, 2000

(51) Int. Cl.$^7$ ................................................ G02B 6/16
(52) U.S. Cl. ......................... 385/123; 385/12; 385/24; 385/16; 65/395
(58) Field of Search ...................... 385/123, 122–128, 385/147, 12–24, 142; 65/384, 395, 390

(56) References Cited

U.S. PATENT DOCUMENTS 5,911,025 A * 6/1999 Garito et al. ............ 385/123 X 6,289,161 B1 * 9/2001 Schotz et al. ................. 385/142

OTHER PUBLICATIONS

"Measurement of Low Oxygen Concentrations by Phosphoescence Lifetime Using Fiber Optic", Campo, Perez, et al., IEEE 1998 Instrumentation and Measurement Conference.
"An Integrated Optical technology Based on Sol Gel Glasses on Silicon: The Nodes Project", Yeatman, 1995 SBMO/IEEE MTT–S IMOC '95 Conference Proceedings.
"Applications of sol–gel films in optical wavelength filters", Blue, Mauchline, Stewart, Electronics Letters, Mar. 3, 1994, vol. 30, No. 5, p. 402.
"Detecting Alpha Radiation by Scintillation in Porous Materials", Keillor, Burggraf, IEEE Transactions on Nuclear Science, vol. 44, No. 5, Oct. 5, 1997, 1741–1746.
"A Distributed Fiber Optic Sensor Based on Cladding Fluoresence", Lieberman, Blyler, Cohen, Journal of Lightwave Technology, vol. 8, No. 2, Feb. 2, 1990, 212–220.

* cited by examiner

Primary Examiner—Phan Palmer

(57) ABSTRACT

A process of fabricating a fiber device includes providing a hollow core fiber, and forming a sol-gel material inside the hollow core fiber. The hollow core fiber is preferably an optical fiber, and the sol-gel material is doped with a dopant. Devices made in this manner includes a wide variety of sensors.

44 Claims, 15 Drawing Sheets

Passive Single-Ended, Integrated sol-gel Fiber Optic Sensor

Interaction between environment and doped sol-gel creates light via emission from luminescent centers in the dopant and/or sol-gel

SOL-GEL PROCESSING TO FORM DOPED SOL-GEL MONOLITHS INSIDE HOLLOW CORE OPTICAL FIBER AND SOL-GEL CORE FIBER DEVICES MADE THEREBY

ORIGIN OF THE INVENTION

Joint invention by Government and small business/university contractor employees.

The invention described herein was made in the performance of work under a NASA contract and by an employee of the United States Government and is subject to Public Law 96-517 (35 U.S.C. §200 et seq.). The contractor has not elected to retain title to the invention.

TECHNICAL FIELD

The invention relates to the field of fiber devices, and in particular, to integrated fiber optic sol-gel sensors and related technology.

BACKGROUND ART

The preparation of single and multicomponent glasses using sol gel processes has been known for about 50 years. Sol gel glasses can be prepared with dopant to modify the physical, electronic or optical properties of the material. Such modifications can include index of refraction, dielectric constant, optical transmission characteristics. Sol-gel materials have been used in combination with optical fibers for many applications, and there is significant R&D activity in the area of combining sol-gel materials with optical fiber for sensing applications. Examples of possible uses include chemical sensing, stress monitoring, pressure sensing, and temperature sensing, in the fields of biomedical monitoring and smart structures, for example.

The fiber optic sensor market has the potential for tremendous growth. To illustrate the potential for fiber optic sensing technologies, consider, for example, chemical sensing. Driven by their increased use in biomedical applications, fiber optic chemical sensors may have accounted for almost 60% of the total fiber optic sensor market in 1998. This corresponds to a revenue of $540 million for all chemical sensors.

As a specific example, there are very sensitive methods for the detection of phosphatases. The advantages of using an optical fiber sensor in such an application include the following: the volume of enzyme and substrate containing fluid solution needed for analysis can be smaller than in the other techniques, which is important because the substrates are very expensive; the sensor itself can be very small; and the sensor can be relatively inexpensive and therefore disposable.

Fiber optic sensors are a rapidly g owing field in other areas as well. Since fiber optics are lightweight, EMI immune, and passive, they are excellent candidates for a variety of newly emerging applications such as smart sensors. Smart sensors are embedded in a structure, e.g. an aircraft fuselage, and can allow for online real time health monitoring of the structure.

Some publications relating to fiber sensors are listed below:

1. "Measurement of Low Oxygen Concentrations by Phosphoescence Lifetime Using Fiber Optic", Campo, Perez, et. al., IEEE 1998 Instrumentation and Measurement Conference
2. "An Integrated Optical Technology Based on Sol Gel Glasses on Silicon: The Nodes Project", Yeatman, 1995 SBMO/IEEE MTT-S IMOC '95 Conference Proceedings
3. "Applications of sol-gel films in optical wavelength filters", Blue, Mauchline, Stewart, Electronics Letters, $3^{rd}$ Mar. 1994, Vol. 30, No. 5, pg 402
4. "Detecting Alpha Radiation by Scintillation in Porous Materials", Keillor, Burggraf, IEEE Transactions on Nuclear Science, Vol 44, No. 5, Oct. 5, 1997, 1741–1746
5. "A Distributed Fiber Optic Sensor Based on Cladding Fluoresence", Lieberman, Blyler, Cohen, Journal of Lightwave Technology, Vol. 8, No. 2, Feb. 2, 1990, 212–220

However, the existing technologies involving sol-gel fiber optic sensors have involved evanescent coupling to the fiber optic through sol-gels applied as an external media. Existing sol-gel sensors either have sol-gel as a thin film or deposited material along the outside of the optical fiber, or are in the shape of monoliths with dopants deposited on the surface of the monolith. Such optical seniors are usually engineered either by coating the surface of the optical fiber, or by attaching directly to the fiber, water-soluble systems contained in porous membranes.

The thin film or deposited material types operate through evanescent optical coupling by light being coupled from the outside film or material down to the core of the optical fiber such that the sensor information in the form of an optical signal can be guided down the core of the fiber. However, this method of coupling is disadvantageously optically lossy, allowing very little of the light in the cladding to actually be coupled for guidance in the core.

Another drawback is that the amount of sensor reagent is proportional to the amount of bulk sol-gel material processed due to the solubility limits of the sol-gel, and the amplitude of the sensor signal is directly proportional to the amount of sensor reagent. Therefore, the smaller the sol-gel volume, the smaller the effective volume for the sensing. In thin film applications, the thickness is disadvantageously less than 1 micron, because surface coating limits the thickness of the reagent/sol-gel solution.

In processes where sol-gel monoliths are fabricated, the dopant material is deposited into the pores. of the sol-gel material on the outside surface of the monolith. However, in the prior art, when sol-gel samples are polymerized successfully, they are subjected to high temperatures during the process which can disadvantageously fatigue an optical fiber. The deposition is done in this fashion due to the processing temperature required in the prior art for polymerization (approximately 1000 degrees C.). Also, disadvantageously, when the monolith is exposed to environmental elements, the dopants tend to leach out.

Applicant realized that it would be advantageous to have a fiber sol-gel sensor which overcame the above disadvantages and drawbacks of the prior art. Applicant realized that such a device would be a fiber having a sol-gel core. However, successful polymerization of sol-gel monoliths inside of a hollow core fiber such that the system becomes a functional waveguide was not known.

Therefore, a need existed for a fiber device having a sol-gel core, and a method for manufacturing same, which overcame the drawbacks and disadvantages of the prior art.

STATEMENT OF INVENTION

The invention relates to a process of fabricating fiber devices having a doped sol-gel core, a plurality of fiber device products made by the process, and a plurality of apparatus utilizing a fiber device product made according to the process.

It is, therefore, a principal object of this invention to provide sol-gel core fiber devices, and in particular, to provide an optical fiber sensor using sol-gel processing of monoliths inside a hollow core fiber.

It is another object of the invention to provide methods for producing the sol-gel core fiber devices.

These and other objects of the present invention are accomplished by the invention disclosed herein.

According to an aspect of the invention, the characteristics of sol-gel materials and the sensors made with these materials according to the invention, provide a number of advantages. These characteristics and advantages include their rigidity, their chemical inertness, their high porosity, that they are hydrophilic, their optical transparency, their good dynamic range, and their ease of processing.

The rigidity provides resistance to mechanical deformation. The is chemical inertness provides low chemical interaction with the environment. The high porosity entraps photometric reagents, for example, but leaves them exposed to exogenic analytes, with minimal chemical interaction or interference with the source and emitted light. The characteristic of being hydrophilic provides an increased availability of reagents. An improved dynamic range means that simultaneous measurement of several analytes by co-immobilized sensor reagents at different wavelengths is possible.

Also, since sol-gel changes color in the presence of certain chemicals, chemical monitoring is enhanced.

Further, using sol-gels eliminates the need for other equipment, e.g., signal processors, other sensors, in certain applications.

According to an aspect of the invention, a device is produced having a solid core monolith structure.

According to an aspect of the invention, it is an object to practice a process for manufacturing fiber optic sensors using hollow core optical fiber waveguides and customizable silica sol-gel cores.

According to an exemplary embodiment of the invention, an optical fiber sensor with a solid, monolithic, sol-gel core is produced. This distinguishes the technology from other sol-gel sensors, simplifying the fabrication process and offering the versatility of being able to vary the properties of the sol-gel core for custom applications.

According to an aspect of the invention, it is an object to practice a process of partially filling the hollow core of the fiber with a solid monolithic sol-gel. The remainder of the core can then be filled with the sample to be sensed.

In particular, according to an aspect of the invention, a number of criteria for a successfully polymerized sol-gel fiber sensor element are is met. These criteria include producing a solid monolith sol-gel core continuous and free of cracks, such that light can be propagated down the fiber containing the monolith.

According to an aspect of the invention, great improvements over existing technology are achieved, including the ability to produce monoliths within a hollow core fiber. The processing by which sol-gel materials are fabricated successfully into monoliths inside of hollow core optical fiber is unique.

According to an aspect of the invention, the use of hollow core fiber filled with a sol-gel core, makes a variety of novel applications possible, and improves applications of sol-gel fiber sensors that already exist. In the past, optical sensors were usually engineered either by coating the surface of the optical fiber or by attaching directly to the fiber, water-soluble systems contained in porous membranes. Surface coating limits the thickness of reagent/sol-gel solution to approximately 1 $\mu$m. According to an aspect of the present invention, the ability to increase the amount of the sensor reagent is achieved through the use of a sol-gel core. Increasing the amount of sensor reagent increases the amplitude of the detection signal, for example.

According to an aspect of the invention, the fabrication of an exemplary sol-gel sensor includes polymerizing at low temperatures, for example, a maximum of approximately 100 degrees C., to form a monolith inside a hollow core optical grade fiber. In the past, in most cases when sol-gel samples are polymerized successfully they are subjected to high temperatures, e.g., 1000 degrees C., during the process which can disadvantageously fatigue an optical fiber.

According to an aspect of the invention, low temperature processing of a sol-gel core to allow temperature sensitive dopants for inclusion is achieved. This provides the ability to customize core for dielectric, optical, semiconductor, electronic properties or a combination of these properties.

According to an aspect of the invention, a low temperature processed metal alkoxide monolith as a customized, dopable core for a hollow core fiber is produced.

According to this aspect of the invention, near room temperature processing permits a wide choice of dopants, including biological and biochemical, for example. Advantageously, according to this low-temperature processing aspect of the invention, proteins and enzymes can be encapsulated within the sol-gel matrix without any degradation or decrease in enzymatic activity.

According to an aspect of the invention, a large challenge of fabricating cores inside of hollow core optical fiber is overcome, namely, shrinkage and cracking of the material as it polymerizes.

According to an aspect of the invention, a disclosed process combines chemistry and materials processing, such that sol-gels are fabricated inside of a hollow core fiber without cracking to achieve a solid core.

According to an aspect of the invention, sol-gel material is successfully polymerized without cracks into a solid monolith inside a hollow core fiber, such that it can propagate an optical signal similar to that of a optical fiber waveguide. In other words, advantageously, a solid monolithic sol-gel core fiber is produced which is continuous and free of cracks such that light can be propagated down the fiber containing the monolith.

Advantageously, according to an aspect of the invention, the ability to control the shrinkage and bulk density of the sol-gel during the curing phase to customize the fully polymerized final monolith is achieved.

According to an aspect of the invention, the option of coprocessing or post-processing dopants is provided. Because some dopants may not be compatible with the sol-gel formation process, they must be added post-process, i.e., after the sol-gel has been formed, prior to injection into the fiber.

According to an aspect of the invention, in an exemplary process, dopants are added as part of the sol-gel matrix. The doped sol-gel is the inserted as a complete system into a hollow core fiber. Therefore, the dopants stay intact through the material matrix. Also, the entire doped sol-gel material stays protected by the surrounding hollow core fiber of the finished device.

According to an aspect of the invention, advantages derived from using sol-gels include a large pore density which allows doping with significant levels of scintillators without quenching by the sol-gel matrix, a large variety of scintillators and luminesce t materials can be used for detection of neutral particles, charged particles and photons over a wide range of energies, and nuclear, biological and chemical sensors can be produced.

According to an aspect of the invention, device performance is enhanced by increasing the amount of dopant material due to the geometry of the cylinder shape. The amount of reagent is proportional to the amount of bulk sol-gel material processed due to the solubility limits of the sol-gel. Therefore, the larger the sol-gel volume the larger the effected volume for the sensing performance.

According to an aspect of the invention, the ability to place relatively large concentrations of dopant, trapped in the sol-gel matrix, resistant to leaching effects from solvents is achieved.

According to an aspect of the invention, the sol-gel provides a substrate for reactions and catalysis sites, and becomes a platform for observing and controlling reaction kinetics.

According to an aspect of the invention, Sol-gel is doped with a material that can be exploited to use the monolith element inside the hollow core fiber as an optical fiber sensor.

According to an aspect of the invention, a series of customized optical fibers based on different dopants in the sol-gel core are fabricated.

According to an aspect of the invention, a process is used to generate a class of fiber optic devices containing a core that can be customized for a variety of photonic applications.

According to an aspect of the invention, a core made of sol-gels can be doped with materials that are soluble in the sol-gel formula such that a variety of sensors can be fabricated by using different dopant materials.

According to an aspect of the invention, the same process can be used to fabricate a class of integrated sol-gel fiber optic devices capable of sensing and/or as acting as active or passive optoelectronic devices, for example. By controlling the dopants, a wide variety of devices can be fabricated.

According to an aspect of the invention, a variety of additional material dopants are possible for other sensing or communications applications.

According to an aspect of the invention, using the exemplary method described herein, it is possible to create a whole class of fiber optic devices based on one basic design. The basic design can be altered to serve many different sensing needs. The way in which the design is altered is by changing the selection of the sol-gel material to custom suit the sensing application. The appropriate sol-gel material for the sensor application would be the material whose properties cause it to change color to indicate the presence of the chemical or condition being monitored, for example.

According to an aspect of the invention, a fiber optic cable is filled with a sol-gel core. Fiber optic cable offers the advantage of being able to withstand harsh environments. By using a fiber optic cable with modifiable properties of the sol-gel core, the sol-gel hollow core configuration can be customized to operate in various sensing applications. The invention allows for the practicality of having just one basic sensor design which, with simple modifications, can cover a multitude of sensing needs.

According to an aspect of the invention, a large base of sensor applications can be covered by the technology with associated significant commercial potential for such sensors.

According to an aspect of the invention, it is an object to produce single ended or in-line structures. In a single-ended structure, the doped sol-gel core is located in a region at one end of an optical fiber. In an in-line structure, the doped sol-gel core is located in a region with regular optical fiber on either side.

According to an aspect of the invention, a sensor is fabricated for use as a luminescent element.

According to an aspect of the invention, sensing of compounds via luminescence of dopants in the sol-gel is accomplished.

According to an aspect of the invention, optical and electro-optical devices, such as wavelength division multiplexers, and other devices, as part of fiber optic and optical networks can be produced.

According to an aspect of the invention, a family of sensors is produced that can be custom doped for various applications in the field of fiber optic sensors. Since fiber optics are lightweight, EMI immune, and passive, they are excellent candidates for a variety of newly emerging applications such as smart sensors. Smart sensors are embedded in a structure (e.g. aircraft fuselage) and can allow for online real time health monitoring of the structure.

According to an aspect of the invention, applications of devices made according to the invention include chemical sensing, stress monitoring, pressure sensing, and temperature sensing in the fields of biomedical monitoring and smart structures, for example.

According to an aspect of the invention, a sensor for passive sensing, e.g., chemi-luminescence sensing, or active sensing, e.g., laser excited luminescence sensing, is achieved.

According to an aspect of the invention, a sensor according to an exemplary embodiment of the invention can be combined with other forms of fiber optic sensing, including strain, temperature, electromagnetic, vibration, acoustic, for example.

According to an aspect of the invention, a device according to an exemplary embodiment of the invention is useful for optical communications and other optical signal processing applications, such as wavelength division multiplexing, optical bandpass and bandstop filtering, and amplification.

According to an aspect of the invention, an exemplary embodiment of the invention takes advantage of faraday effect by converting sol-gel to a faraday glass for magneto-optical and electro-optical devices.

According to an aspect of the invention, doping with scintillating halides for radiation detection of x-rays, gamma rays, low energy electrons, protons, or alpha-particles, for example, is accomplished.

According to an aspect of the invention, an exemplary embodiment of the invention can be used as detector in a countermeasure against laser attacks or laser surveillance against troops, equipment, or $C^3l$ infrastructure (Command, Control, Communications, Intelligence), for example.

According to an aspect of the invention, an exemplary embodiment of the invention has applications in arms control and monitoring.

According to an aspect of the invention, advantages of the exemplary fiber optics devices include immunity to electromagnetic interference and jamming, radiation hardening capabilities, the provision of sensing and communications on the same medium, high speed and wide bandwidth, the ability to provide secure point to point links, and lightweight configuration, requiring low power and occupying very little space, which can be used covertly.

According to an aspect of the invention, advantages of an integrated fiber optic sol-gel sensor include speed because the electric dipole transitions can produce radiative decays on the order of a few nanoseconds. Sub-nanosecond decays can be achieved with materials such as $BaF_2$ via core-valence transitions.

According to an aspect of the invention, an integrated fiber optic sol-gel radiation sensor allows for fast detection times and detection of fast radiative emissions. Because the emission occurs in the waveguide, most of the photons can be transmitted directly to a detector.

According to an aspect of the invention, chemical and biological sensing is achieved. An exemplary process according to the invention is highly compatible with sensitive biological materials because of the benign temperatures and conditions.

According to an aspect of the invention, applications such as wavelength division multiplexing, optical bandpass and bandstop filtering, and amplification can be achieved.

According to an aspect of the invention, an exemplary embodiment takes advantage of faraday effect by converting sol-gel to a faraday glass for magneto-optical and electro-optical devices. Doping with scintillating halides for radiation detection of x-rays gamma rays, low energy electrons, protons, a-particles. Communications and sensing are realized in the same fiber. Use as detector in a countermeasure against laser attacks or laser surveillance against troops, equipment, or $C^3l$ infrastructure is envisioned.

According to an aspect of the invention, fluorescent transitions of alkaline phosphatase reactions can be monitored by the integrated fiber optic sol-gel sensor according to an exemplary embodiment of the invention. Phosphatase activity measurements are very important in cell biology and medicine for example in the detection of cancer and biochemical processes in cells. There are very sensitive methods for the detection of phosphatases. An advantage of an optical fiber sensor is that the volume of enzyme and substrate containing fluid solution needed for analysis can be smaller than in the other techniques. This is important because the substrates are very expensive. Also, the sensor is very small and disposable.

According to an aspect of the invention, a sensor can be manufactured as a miniature disposable element mechanically connected to the optical fiber.

According to an aspect of the invention, fiber optics filled with sol-gel can be used in a variety of industries. These include automotive as sensors in engines and for "intelligent" highways; communications to speed up transfer of data and information; environmental for real-time monitoring of toxic compound emissions; food processing, for quality control of food constituents; manufacturing in control systems and sensors within extreme environments; and in medicine for in vitro diagnostics of physiological analytes, monitoring blood constituents, drug dosage/concentrations, and other body chemistry, for example.

According to an aspect of the invention, once an optical fiber element is fabricated successfully, the element can be spliced to an appropriate fiber(s), e.g., multimode or single mode fibers, or attached to an integrated optical substrate or other photonic device.

According to an aspect of the invention, communications and sensing are realized in the same fiber.

According to an aspect of the invention, Sol-gel material is successfully polymerized without cracks into a solid monolith, such that it can propagate an optical signal similar to that of a optical fiber waveguide.

According to an aspect of the invention, the doped sol-gel serves as both detection medium and waveguide.

Advantageously, scintillation in the waveguide confines the emitted photons to the waveguide. Other sol-gel fiber optic sensors depend upon evanescent coupling through the cladding of the fiber.

According to an aspect of the invention, by fabricating a doped core, the sensor element and the waveguide core are the same, which allows light to be guided to the detection equipment without evanescent coupling.

A process of producing a sensor element comprised of a hollow core fiber with sol gel material polymerized inside will be described. Sol gel material is successfully polymerized without cracks into a solid monolith, such that it can propagate an optical signal similar to that of a optical fiber waveguide, Sol gel is doped with a material that can be exploited to use the monolith element inside the hollow core fiber as an optical fiber sensor. A dopant material such as calcofluor or fluorescein is an example of a dopant material used for fabrication of a luminescent sensor element. Criteria for a successfully polymerized sensor element: a solid monolith continuous and free of cracks such that light can be propagated down the fiber containing the monolith.

The exemplary method follows process steps in order from a cleaning process, to a sol-gel solution production process, to a polymerization process in succession. Alternatives that can be used with the other process steps are described, as long as only one alternative is used per processing.

The chemicals used include: Tetraethyl orthosilicate (TEOS), ethanol, nitric acid, deionized water, hydrochloric acid, calcofluor (fluorescent material), fluorescein (luminescent material), sodium chloride.

The equipment used includes: Parr Microreactor, CMA Microdialysis pump, 100/140 micron hollow core optical fiber, 10/125 micron optical fiber, Tygon™ tubing, cleaving tools, splice tubes, single mode optical fiber, and fusion splicer. Although Tygon™ tubing is specified, it is noted that any tubing could be used so long as it does not react with the sol-gel material and the sol-gel material will not stick to it.

An exemplary embodiment of a process of fabricating a fiber device includes providing a hollow core fiber, and forming a sol-gel material inside the hollow core fiber. The hollow core fiber is preferably an optical fiber. The sol-gel material is doped with a dopant either prior to formation inside the fiber or thereafter.

According to an aspect of the invention, the dopant may be at least one of a fluorescent material, e.g., calcofluor, or a luminescent material, e.g., fluorescein.

According to an aspect of the invention, the hollow core fiber is processed prior to forming the sol-gel material therein. This processing of the hollow core fiber prior to forming the sol-gel material therein may include cleaning the hollow core fiber.

According to an aspect of the invention, the cleaning of the hollow core fiber includes injecting at least one cleaning chemical into the hollow core fiber. According to an exemplary embodiment, the following chemicals are injected in the following order: optimal grade hexane; HPLC grade isopropanol; deionized water; and optimal grade acetone.

According to an aspect of the invention, the hollow core fiber is air-dried after the injecting of the optimal grade acetone, preferably for approximately 24 hours.

According to an aspect of the invention, the forming a sol-gel material inside the hollow core fiber may include producing a doped sol-gel solution; injecting the doped sol-gel solution into the hollow core fiber; and polymerizing the sol-gel solution inside the hollow core fiber.

According to an exemplary embodiment of the invention, the step of producing a doped sol-gel solution may include mixing 20 ml of TEOS, 20 ml of deionized water, 20 ml of ethanol, 2.5 ml of Hydrochloric acid 0.1 N, and 3 mg calcofluor or fluorescein, to form a solution; placing the solution into a reaction chamber in a sealed chamber, for approximately 15 minutes, heating to 100 degrees C. during which solution is stirred; venting the reaction chamber by opening a gas release valve 100% for approximately 20 minutes or until microreactor reaches 8 psig (pounds per square inch gauge, where 0 psig~14 psi absolute) during which the solution cools at room temperature through conduction of the microreactor, so that the temperature of the solution is approximately 80 degrees C. when removed, without using induced cooling; placing the solution into a microdialysis syringe; and pumping the solution into a Tygon™ tubing which holds a piece of cleaved hollow core fiber.

According to another exemplary embodiment of the invention, the step of producing a doped sol-gel solution may include mixing 50 ml of TEOS, 2.5 ml of ethanol, 10 ml of Hydrochloric acid 0.1 N, and 3 mg calcofluor or fluorescein to form a solution; placing the solution into a reaction chamber in a sealed chamber, for approximately 60 min, heat to 100 degrees C. during which solution is stirred and left at 100 degrees C. for the rest of the 60 min period; venting the reaction chamber by opening a gas release valve 100% for long enough for the chamber to stabilize at 8 psig (pounds per square inch gauge, where 0 psig~14 psi absolute) during which the solution cools at room temperature through conduction of the microreactor, so that the temperature of the solution is approximately 80 degrees C. when removed, without using induced cooling; placing the solution into a microdialysis syringe; and pumping the solution into a Tygon™ tubing which holds a piece of cleaved hollow core fiber.

According to another exemplary embodiment of the invention, the step of producing a doped sol-gel solution may include mixing 20 ml of TEOS, 10 ml of deionized water, 10 ml of ethanol, 2.5 ml of Hydrochloric acid 0.1 N, and 3 mg calcofluor or fluorescein to form a solution; placing the solution into a reaction chamber in a sealed chamber, for 15 minutes, heat to 100 degrees C. during which solution is stirred; venting the reactor by opening the gas release valve 100% for approximately 20 minutes or until microreactor reaches 8 psig (pounds per square inch gauge, where 0 psig~14 psi absolute) during which the solution cools at room temperature through conduction of the microreactor, so that the temperature of the solution is approximately 80 degrees C. when removed without induced cooling; placing the solution into a microdialysis syringe; and pumping the solution into a Tygon™ tubing which holds a piece of cleaved hollow core fiber.

According to an exemplary embodiment of the invention, the step of polymerizing of the sol-gel solution inside the hollow core fiber may include, while a Tygon™ tubing holding a hollow core fiber is injected with sol-gel material via a micro dialysis pump method or by a dialysis pump method, the other end of the tubing is inserted into a dialysis bag 10 mm diameter, 150 mm long; the sol-gel material is pumped in at 5 ml/minute into the Tygon™ tubing until a few ml is dripping from the other side into the dialysis bag; the rest of the Tygon™ tubing is placed into the bag and the bag tied off on both ends; the bag containing the Tygon™ tubing with sol-gel material inside is placed in a deionized water bath for 6 days; the bag is then removed from the deionized water and placed in to a 10% saline solution for 3 hours; the tubing is then removed and allowed air dry for four days; and the fiber element is then extracted from the tubing.

According to an exemplary embodiment of the invention, the step of polymerizing of the sol-gel solution inside the hollow core fiber may include, while a Tygon™ tubing holding hollow core fiber is injected with sol-gel material via a micro dialysis pump method or by a dialysis pump method, the other end of the tubing is inserted into a dialysis bag 10 mm diameter, 150 mm long; the sol-gel is pumped in at 5 ml/min into the Tygon™ tubing until the fiber element is pushed out the other side of the Tygon™ tubing and inserts into the dialysis bag; the bag is then pumped full of sol-gel until the bag is completely full; the bag containing the fiber element with sol-gel material inside is placed in a deionized water bath for 6 days; the bag is then removed from the deionized water and placed in to a 10% saline solution for 3 hours; the fiber element is then removed from the dialysis bag.

According to another aspect of the invention, a device having a doped sol-gel core according to the present invention is subsequently encapsulated with a sol-gel material to form a new device.

These and other aspects of the invention will become apparent from the detailed description set forth below.

DETAILED DESCRIPTION OF THE INVENTION

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1:
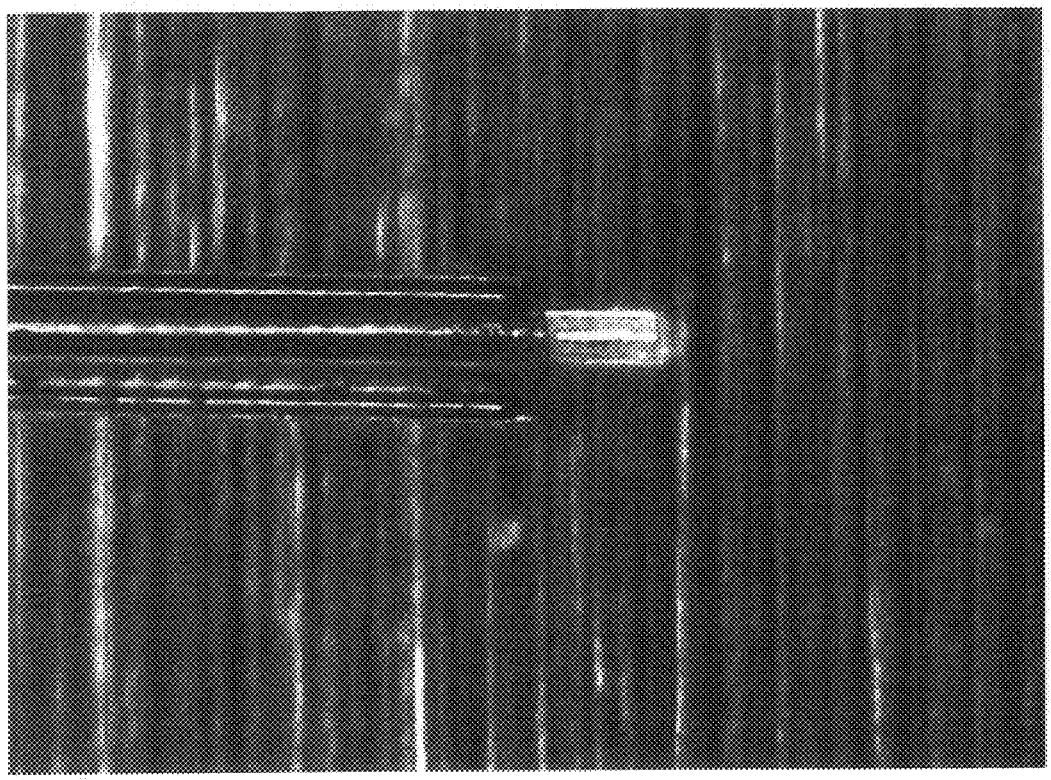
FIG. 1 illustrates a sol-gel core fiber according to an exemplary embodiment of the present invention.

An exemplary embodiment of a process of fabricating a fiber device will now be described. The process includes providing a hollow core fiber, and forming a sol-gel material inside the hollow core fiber. The hollow core fiber is preferably an optical fiber. The sol-gel material is doped with a dopant either prior to formation inside the fiber or thereafter. FIG. 1 illustrates a sol-gel core fiber made according to an exemplary embodiment of the present invention.

In the case of producing a luminescent or fluorescent sensor, the dopant would be at least one of a fluorescent material, e.g., calcofluor, or a luminescent material, e.g., fluorescein.

The hollow core fiber is processed prior to forming the sol-gel material therein. This processing of the hollow core fiber prior to forming the sol-gel material therein includes cleaning the hollow core fiber. The cleaning of the hollow core fiber includes injecting at least one cleaning chemical into the hollow core fiber. According to an exemplary embodiment, the following chemicals are injected in the following order: optimal grade hexane; HPLC grade isopropanol; deionized water; and optimal grade acetone.

The hollow core fiber is air-dried after the injecting of the optimal grade acetone, preferably for approximately 24 hours.

A unique variation on this process is the use of organosilane adhesion agents to improve adhesion of the sol gel to the inner cavity of the fiber. The fiber is soaked in an organosilane solution and cured in a vacuum oven prior to the inclusion of sol gel. The organosilane compounds is Silquest A-174 or equivalent. At least 0.2 ml of adhesion agent is required. The fiber is soaked in the adhesion agent for a minimum of 4 hours, removed from the agent and cured for a minimum of 24 hours at a minimum temperature of 100 C.

According to an exemplary embodiment of the invention, the forming a sol-gel material inside the hollow core fiber includes producing a doped sol-gel solution; injecting the doped sol-gel solution into the hollow core fiber; and polymerizing the sol-gel solution inside the hollow core fiber.

Three exemplary embodiments of the producing a doped sol-gel solution will be described. A first embodiment includes mixing 20 ml of TEOS, 20 ml of deionized water, 20 ml of ethanol, 2.5 ml of Hydrochloric acid 0.1 N, and 3 mg calcofluor or fluorescein, to form a solution; placing the solution into a reaction chamber in a sealed chamber, for approximately 15 minutes, heating to 100 degrees C. during which solution is stirred; venting the reaction chamber by opening a gas release valve 100% for approximately 20 minutes or until microreactor reaches 8 psig (pounds per square inch gauge, where 0 psig~14 psi absolute) during which the solution cools at room temperature through conduction of the microreactor, so that the temperature of the solution is approximately 80 degrees C. when removed, without using induced cooling; placing the solution into a micro dialysis syringe; and pumping the solution into a Tygon™ tubing which holds a piece of cleaved hollow core fiber. Although Tygon™ tubing is specified, it is noted that any tubing could be used so long as it does not react with the sol-gel material and the sol-gel material will not stick to it.

A second embodiment of producing a doped sol-gel solution includes mixing 50 ml of TEOS, 2.5 ml of ethanol, 10 ml of Hydrochloric acid 0.1 N, and 3 mg calcofluor or fluorescein to form a solution; placing the solution into a reaction chamber in a sealed chamber, for approximately 60 min, heat to 100 degrees C. during which solution is stirred and left at 100 degrees C. for the rest of the 60 min period; venting the reaction chamber by opening a gas release valve 100% for long enough for the chamber to stabilize at 8 psig (pounds per square inch gauge, where 0 psig~14 psi absolute) during which the solution cools at room temperature through conduction of the microreactor, so that the temperature of the solution is approximately 80 degrees C. when removed, without using induced cooling; placing the solution into a microdialysis syringe; and pumping the solution into a Tygon™ tubing which holds a piece of cleaved hollow core fiber.

A third embodiment of producing a doped sol-gel solution includes mixing 20 ml of TEOS, 10 ml of deionized water, 10 ml of ethanol, 2.5 ml of Hydrochloric acid 0.1 N, and 3 mg calcofluor or fluorescein to form a solution; placing the solution into a reaction chamber in a sealed chamber, for 15 minutes, heat to 100 degrees C. during which solution is stirred; venting the reactor by opening the gas release valve 100% for approximately 20 minutes or until microreactor reaches 8 psig (pounds per square inch gauge, where 0 psig~14 psi absolute) during which the solution cools at room temperature through conduction of the microreactor, so that the temperature of the solution is approximately 80 degrees C. when removed without induced cooling; placing the solution into a microdialysis syringe; and pumping the solution into a Tygon™ tubing which holds a piece of cleaved hollow core fiber.

A fourth embodiment of producing a doped sol-gel solution includes addition of dimethyl formamide (DMF) as a curing agent to the first, second and third embodiments. The ratio of TEOS/DMF is not less than 100:1 and not greater than 2:1.

A fifth embodiment of producing a doped sol-gel solution includes addition of silica power as strengthening agent. The proportion of silica to TEOS shall not exceed 500 mg silica for every 20 ml TEOS Two exemplary embodiments of the step of polymerizing of the sol-gel solution inside the hollow core fibs will be described. The first embodiment is as follows. While a Tygon™ tubing holding a hollow core fiber is injected with sol-gel material via a micro dialysis pump method or by a dialysis pump method, the other end of the tubing is inserted into a dialysis bag 10 mm diameter, 150 mm long; the sol-gel material is pumped in at 5 ml/minute into the Tygon™ tubing until a few ml is dripping from the other side into the dialysis bag; the rest of the Tygon™ tubing is placed into the bag and the bag tied off on both ends; the bag containing the Tygon™ tubing with sol-gel material inside is placed in a deionized water bath for 6 days; the bag is then removed from the deionized water and placed in to a 10% saline solution for 3 hours; the tubing is then removed and allowed air dry for four days; and the fiber element is then extracted from the tubing.

A second exemplary embodiment of the step of polymerizing of the sol-gel solution inside the hollow core fiber is as follows. While a Tygon™ tubing holding hollow core fiber is injected with sol-gel material via a micro dialysis pump method or by a dialysis pump method, the other end of the tubing is inserted into a dialysis bag 10 mm diameter, 150 mm long; the sol-gel is pumped in at 5 ml/min into the Tygon™ tubing until the fiber element is pushed out the other side of the Tygon™ tubing and inserts into the dialysis bag; the bag is then pumped full of sol-gel until the bag is completely full; the bag containing the fiber element with sol-gel material inside is placed in a deionized water bath for 6 days; the bag is then removed from the deionized water and placed in to a 10% saline solution for 3 hours; the fiber element is then removed from the dialysis bag.

According to the above-described process for manufacturing fiber optic sensors using hollow core optical fiber waveguides and customizable silica sol-gel cores, a device is produced having a solid, monolithic, sol-gel core. This feature distinguishes the invention from other sol-gel sensors which, as described in the background section above, have significant drawbacks and limitations. Besides simplifying the fabrication process, the present invention offers the versatility of being able to vary the properties of the sol-gel core for custom applications by varying the dopant.

As mentioned in summarizing the invention, a number of criteria for a successfully polymerized sol-gel fiber sensor element are met. These criteria include producing a solid monolith sol-gel core continuous and free of cracks, such that light can be propagated down the fiber containing the monolith (see FIGS. 1 and 4, for example). Great improvements over existing technology are achieved, including the ability to produce monoliths within a hollow core fiber. The processing by which sol-gel materials are fabricated successfully into monoliths inside of hollow core optical fiber described above, is unique.

The use of hollow core fiber filled with a sol-gel core, makes a variety of novel applications possible, and improves applications of sol-gel fiber sensors that already exist. In the past optical sensors were engineered either by coating the surface of the optical fiber or by attaching directly to the fiber, water-soluble systems contained in porous membranes. Surface coating limits the thickness of reagent/sol-gel solution to approximately 1_m. However, with the present invention, the ability to increase the amount of the sensor reagent is achieved through the use of a sol-gel core. Increasing the amount of sensor reagent increases the amplitude of the detection signal, for example.

The fabrication of an exemplary sol-gel sensor described above includes polymerizing at low temperatures, for example, a maximum of approximately 100 degrees C., to form a monolith inside a hollow core optical grade fiber. This is in contrast to the previous methods where, when sol-gel samples are polymerized successfully, they are subjected to high temperatures, e.g., 1000 degrees C., during the process which can disadvantageously fatigue an optical fiber.

Low temperature processing of a sol-gel core to allow temperature sensitive dopants for inclusion is achieved with the present invention. This provides the ability to customize core for dielectric, optical, semiconductor, electronic properties or a combination of these properties. A low temperature processed metal alkoxide monolith as a customized, dopable core for a hollow core fiber is produced according to the invention. Near room temperature processing permits a wide choice of dopants, including biological and biochemical, for example. According to this low-temperature processing aspect of the invention, proteins and enzymes can be encapsulated within the sol-gel matrix without any degradation or decrease in enzymatic activity.

A large challenge of fabricating cores inside of hollow core optical fiber is overcome according to the present invention, in particular, shrinkage and cracking of the material as it polymerizes. The above-described process according to an exemplary embodiment of the invention combines chemistry and materials processing, such that sol-gels are fabricated inside of a hollow core fiber without cracking to achieve a solid core. The sol-gel material is successfully polymerized without cracks into a solid monolith inside a hollow core fiber, such that it can propagate an optical signal similar to that of a optical fiber waveguide. The solid monolithic sol-gel core fiber is continuous and free of cracks such that light can be propagated down the fiber containing the monolith.

The ability to control the shrinkage and bulk density of the sol-gel during the curing phase to customize the fully polymerized final monolith is achieved according to the above described process.

The option of coprocessing or post-processing dopants is provided. Because some dopants may not be compatible with the sol-gel formation process, they must be added post-process, i.e., after the sol-gel has been formed, prior to injection into the fiber.

In an exemplary process according to the invention, dopants are added as part of the sol-gel matrix. The doped sol-gel is the inserted as a complete system into a hollow core fiber. Therefore, the dopants stay intact through the material matrix. Also, the entire doped sol-gel material stays protected by the surrounding hollow core fiber of the finished device.

Advantages derived from using sol-gels include a large pore density which allows doping with significant levels of scintillators without quenching by the sol-gel matrix, a large variety of scintillators and luminescent materials can be used for detection of neutral particles, charged particles and photons over a wide range of energies, and nuclear, biological and chemical sensors can be produced.

Device performance is enhanced by increasing the amount of dopant material due to the geometry of the cylinder shape. The amount of reagent is proportional to the amount of bulk sol-gel material processed due to the solubility limits of the sol-gel. Therefore, the larger the sol-gel volume the larger the effected volume for the sensing performance.

The ability to place relatively large concentrations of dopant, trapped in the sol-gel matrix, resistant to leaching effects from solvents is achieved according to the invention.

The sol-gel provides a substrate for reactions and catalysis sites, and becomes a platform for observing and controlling reaction kinetics.

As described above, sol-gel is doped with a material that can be exploited to use the monolith element inside the hollow core fiber as an optical fiber sensor. A series of customized optical fibers based on different dopants in the sol-gel core can be fabricated, as would be apparent to one skilled in the art.

The exemplary process can be used to generate a class of fiber optic devices containing a core that can be customized for a variety of photonic applications. A core made of sol-gels can be doped with materials that are soluble in the sol-gel formula so that a variety of sensors can be fabricated by using different dopant materials. The same process can be used to fabricate a class of integrated sol-gel fiber optic devices capable of sensing and/or as acting as active or passive optoelectronic devices, for example. Simply by controlling the dopants, a wide variety of devices can be fabricated. A variety of additional material dopants are possible for other sensing or communications applications.

The ability to jacket the fiber with sol-gels as well as create intrinsic sol-gel core provides the ability to allow multiple reactions to run while being sensed. For example, the extrinsic sol-gel can be doped for chemi-luminescence of a different reaction by-product than the intrinsic sol-gel.

Using the exemplary method described herein, it is possible to create a whole class of fiber optic devices based on one basic design. The basic design can be altered to serve many different sensing needs. The way in which the design is altered is by changing the selection of the sol-gel material to custom suit the sensing application. The appropriate sol-gel material for the sensor application would be the material whose properties cause it to change color to indicate the presence of the chemical or condition being monitored, for example.

According to the exemplary process described above, a fiber optic cable is filled with a sol-gel core. Fiberoptic cable offers the advantage of being able to withstand harsh environments. By using a fiber optic cable with modifiable properties of the sol-gel core, the sol-gel hollow core configuration can be customized to operate in various sensing applications. The invention allows for the practicality of having just one basic sensor design which, with simple modifications, can cover a multitude of sensing needs. A large base of sensor applications can be covered by the technology with associated significant commercial potential for such sensors.

Figure 2:
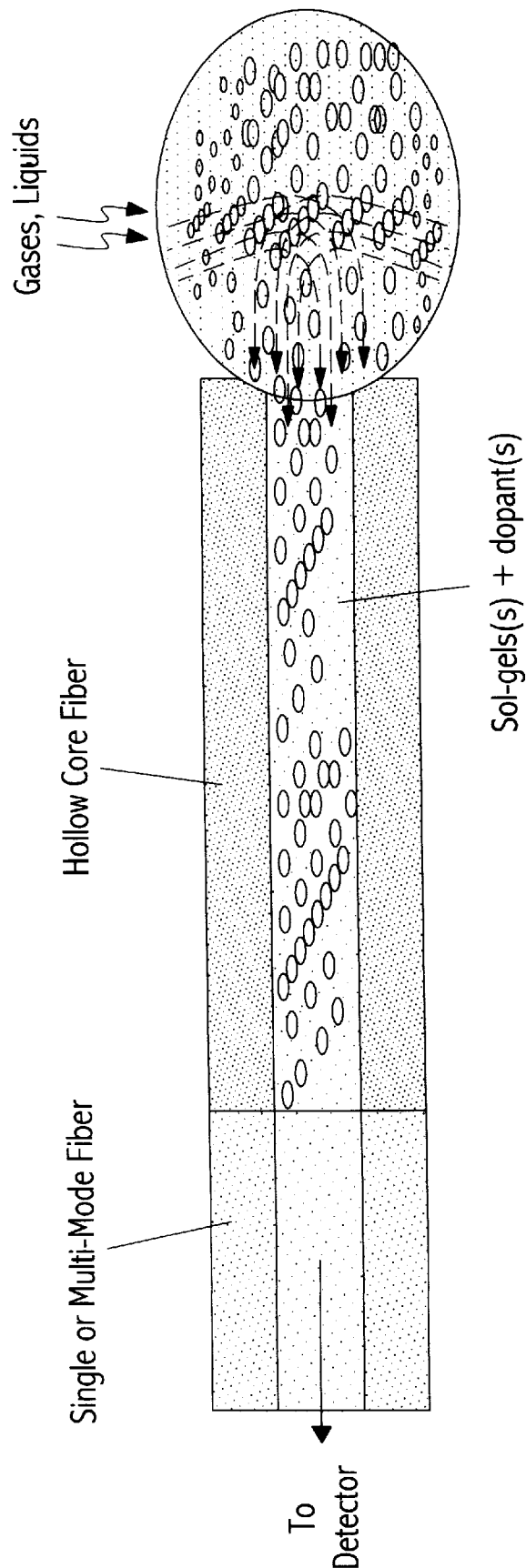
FIG. 2 illustrates a Passive Single Ended, Integrated Sol Gel Fiber Optic according to an exemplary embodiment of the invention.
Figure 3:
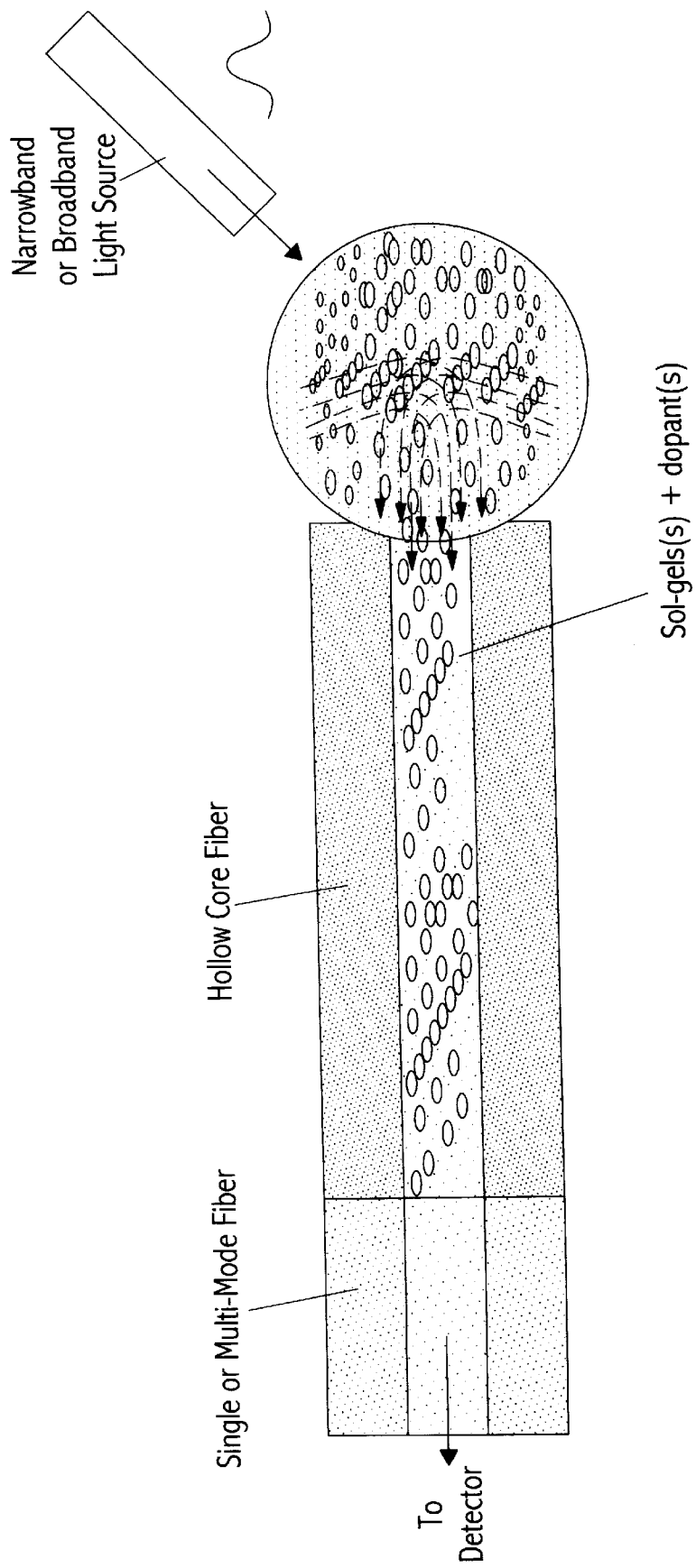
FIG. 3 illustrates Excited Emission Single Ended, Integrated Sol Gel Fiber Optic Sensor according to an exemplary embodiment of the invention.

Single ended or in-line structures can be produced according to the invention. FIG. 2 illustrates a passive single-ended, integrated sol-gel fiber optic structure according to an exemplary embodiment of the invention. FIG. 3 illustrates a Excited Emission Single Ended, Integrated Sol Gel Fiber Optic Sensor according to an exemplary embodiment of the invention. In a single-ended structure, the doped sol-gel core is located in a region at one end of an optical fiber. In an in-line structure, the doped sol-gel core is located in a region with regular optical fiber on either side.

Figure 4:
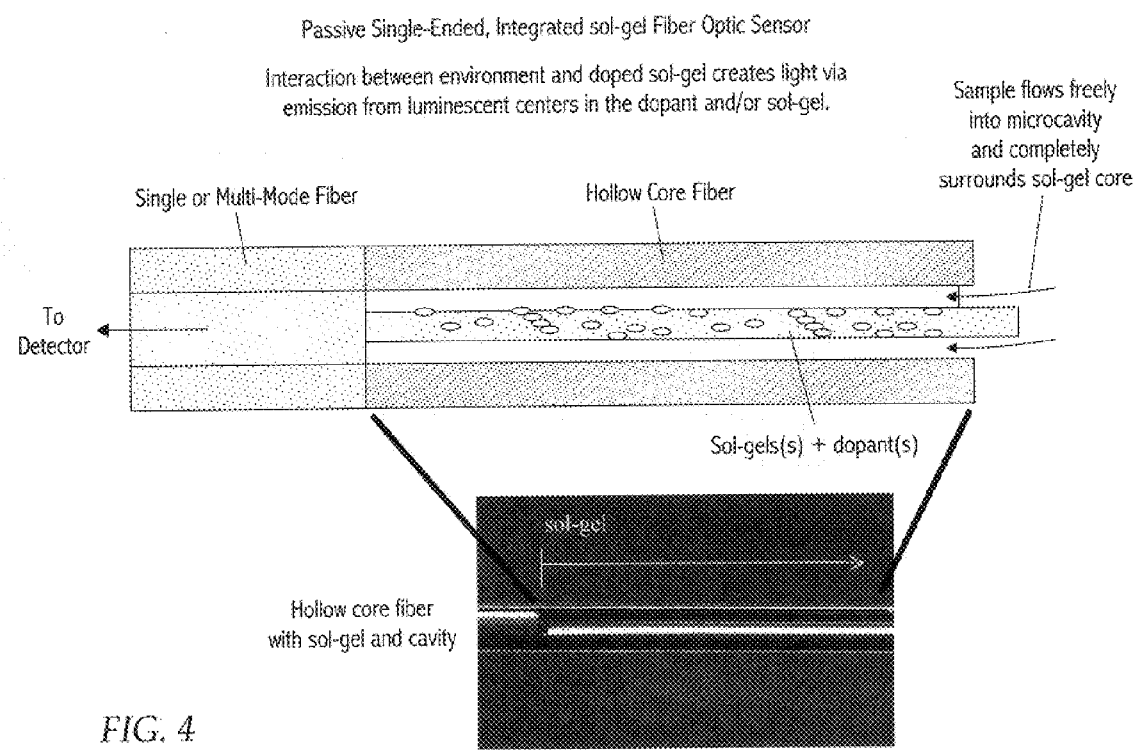
FIG. 4 illustrates Passive Single Ended, Integrated Sol Gel Fiber Optic Sensor, sol gel/cavity according to an exemplary embodiment of the invention.
Figure 5:
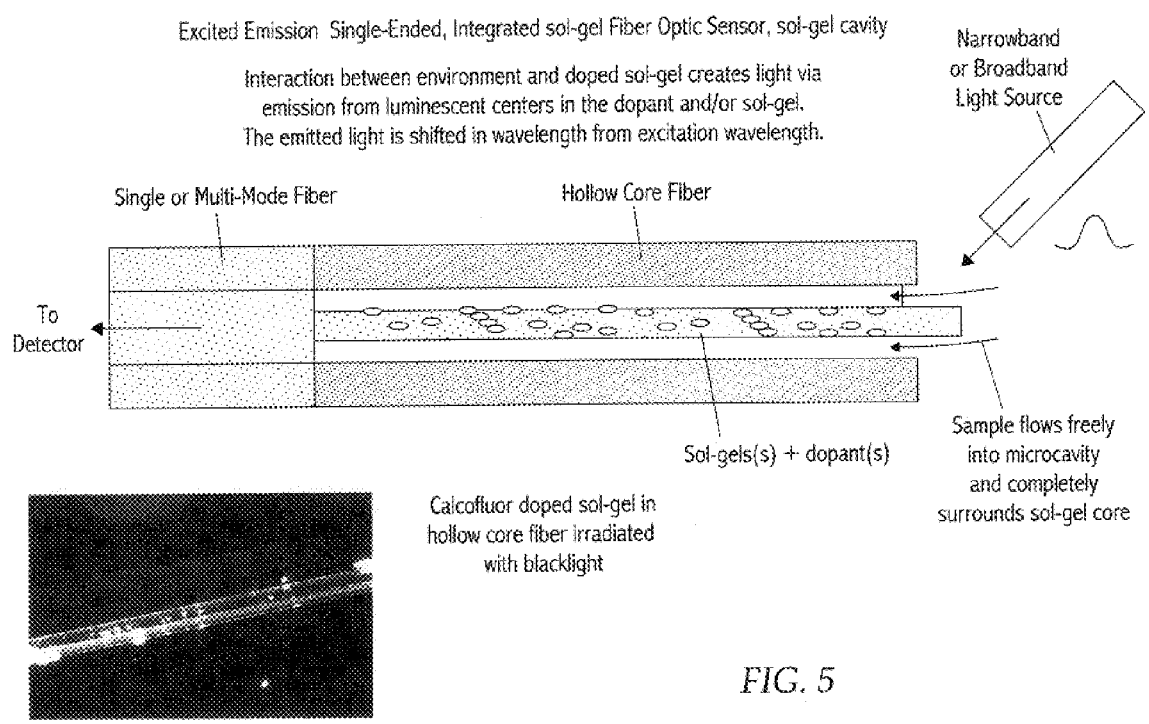
FIG. 5 illustrates Excited Emission Single Ended, Integrated Sol Gel Fiber Optic Sensor, sol gel/cavity according to an exemplary embodiment of the invention.
Figure 6:
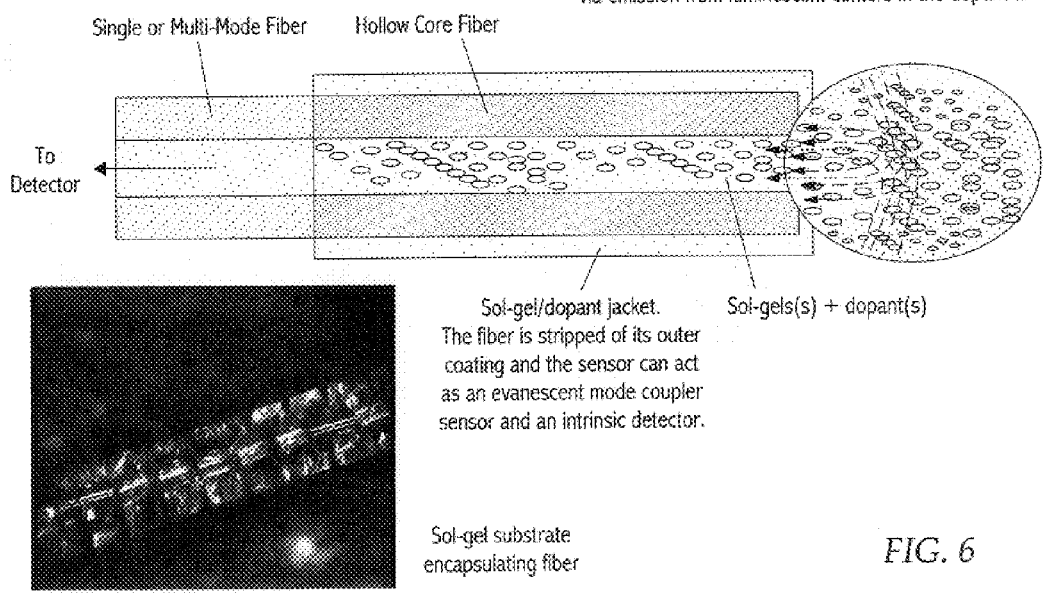
FIG. 6 illustrates a Passive Single Ended, Integrated Sol Gel Fiber Optic Sensor with sol gel jacket with a sol-gel substrate encapsulating a sol-gel core fiber according to an exemplary embodiment of the invention.
Figure 7:
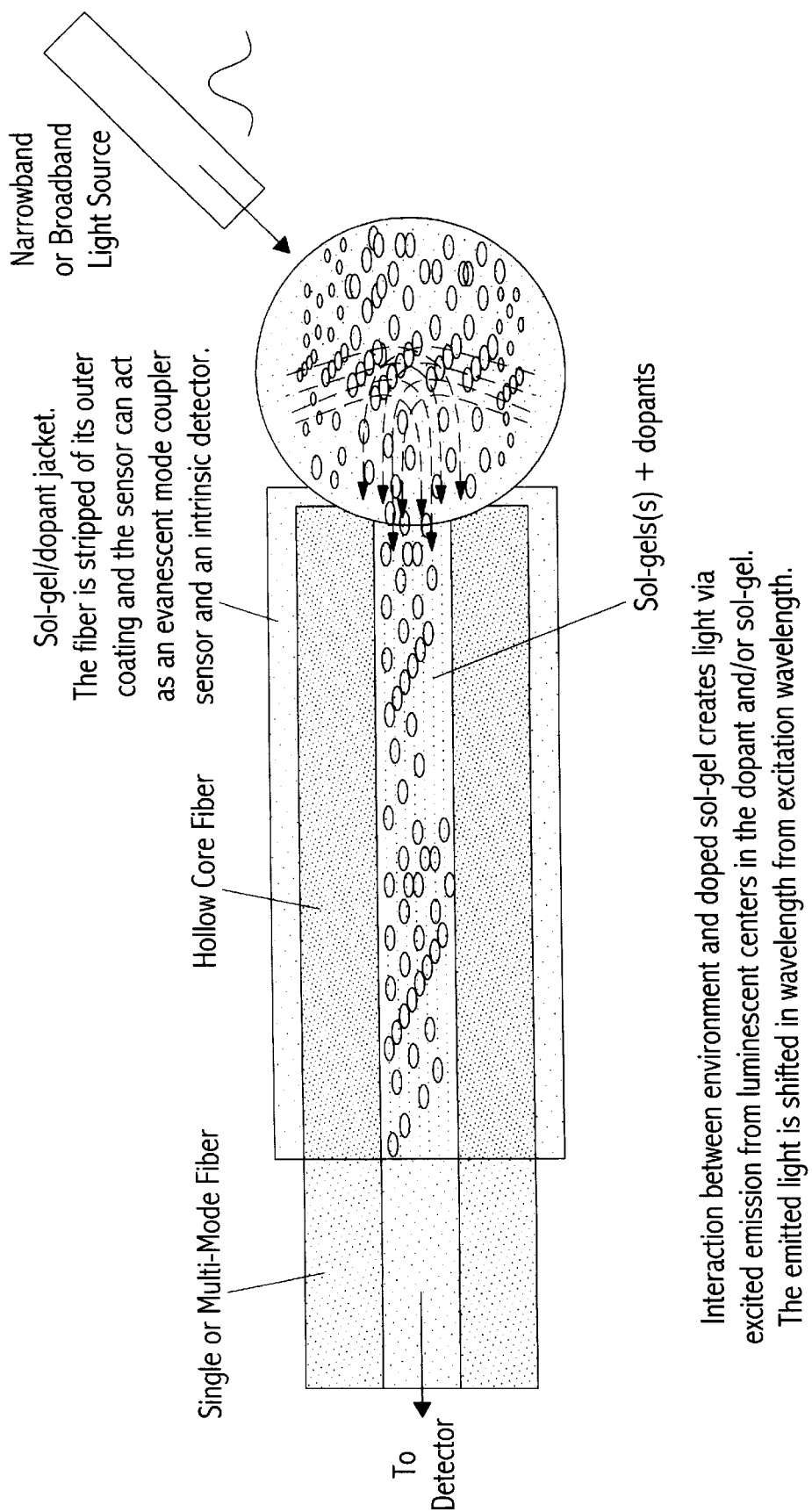
FIG. 7 illustrates Excited Emission Single Ended, Integrated Sol Gel Fiber Optic Sensor with sol gel jacket according to an exemplary embodiment of the invention.
Figure 8:
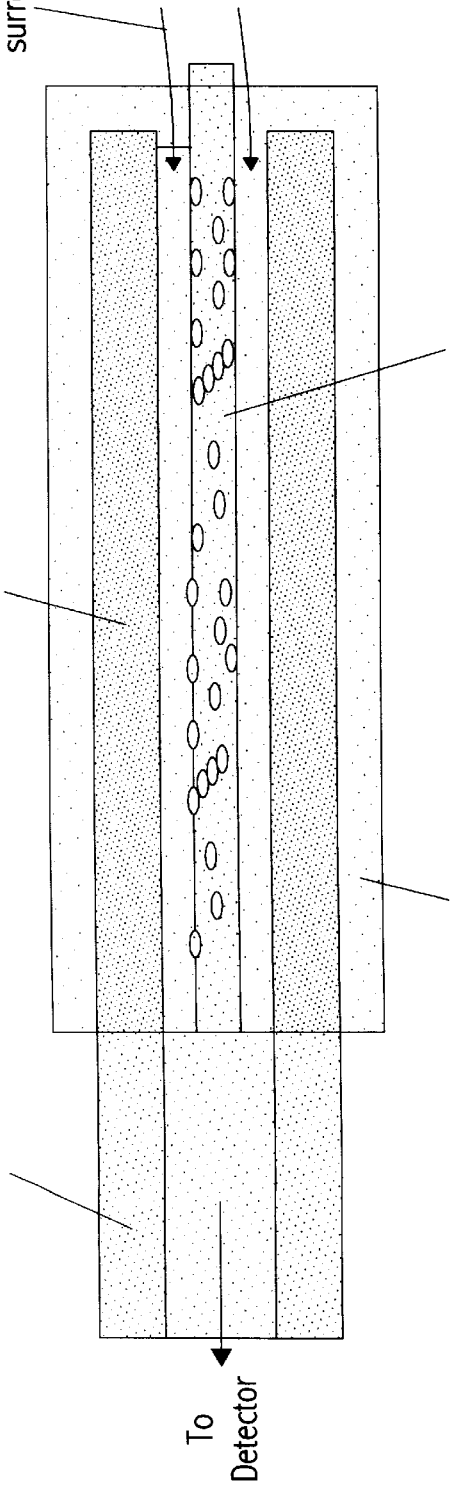
FIG. 8 illustrates Passive Single Ended, Integrated sol-gel Fiber Optic Sensor, sol-gel/cavity with sol-gel jacket according to an exemplary embodiment of the invention.
Figure 9:
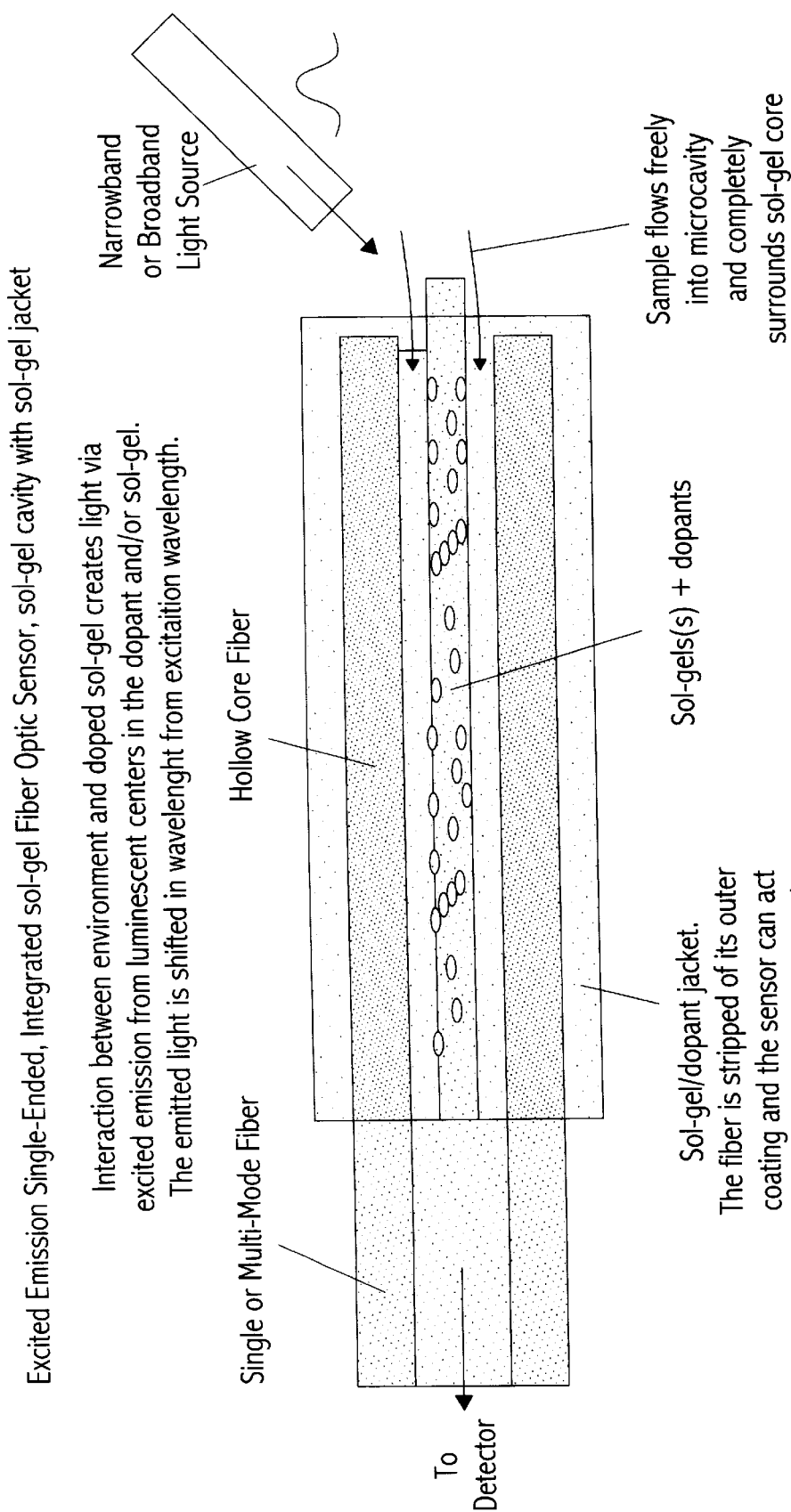
FIG. 9 illustrates Excited Emission Single Ended, Integrated sol-gel Fiber Optic Sensor, sol-gel/cavity with sol-gel jacket according to an exemplary embodiment of the invention.
Figure 10:
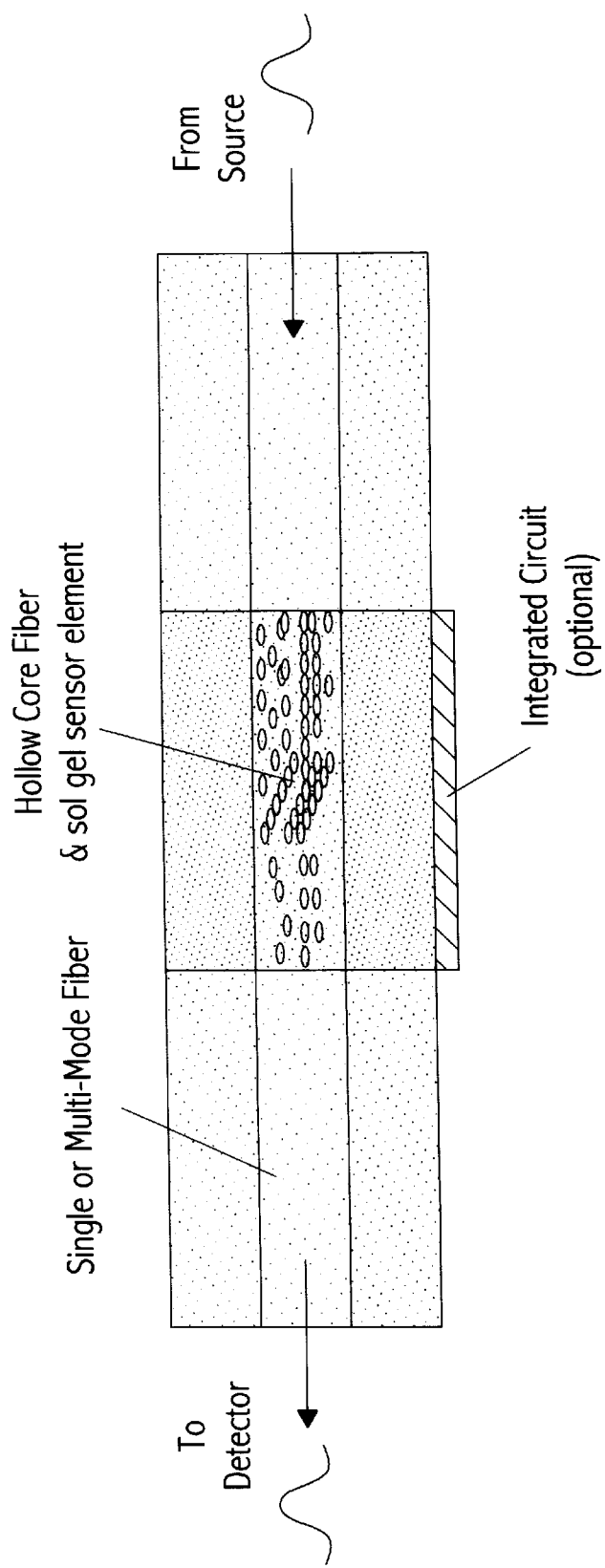
FIG. 10 illustrates Passive In-line, Integrated sol-gel Fiber Optic Sensor according to an exemplary embodiment of the invention.
Figure 11:
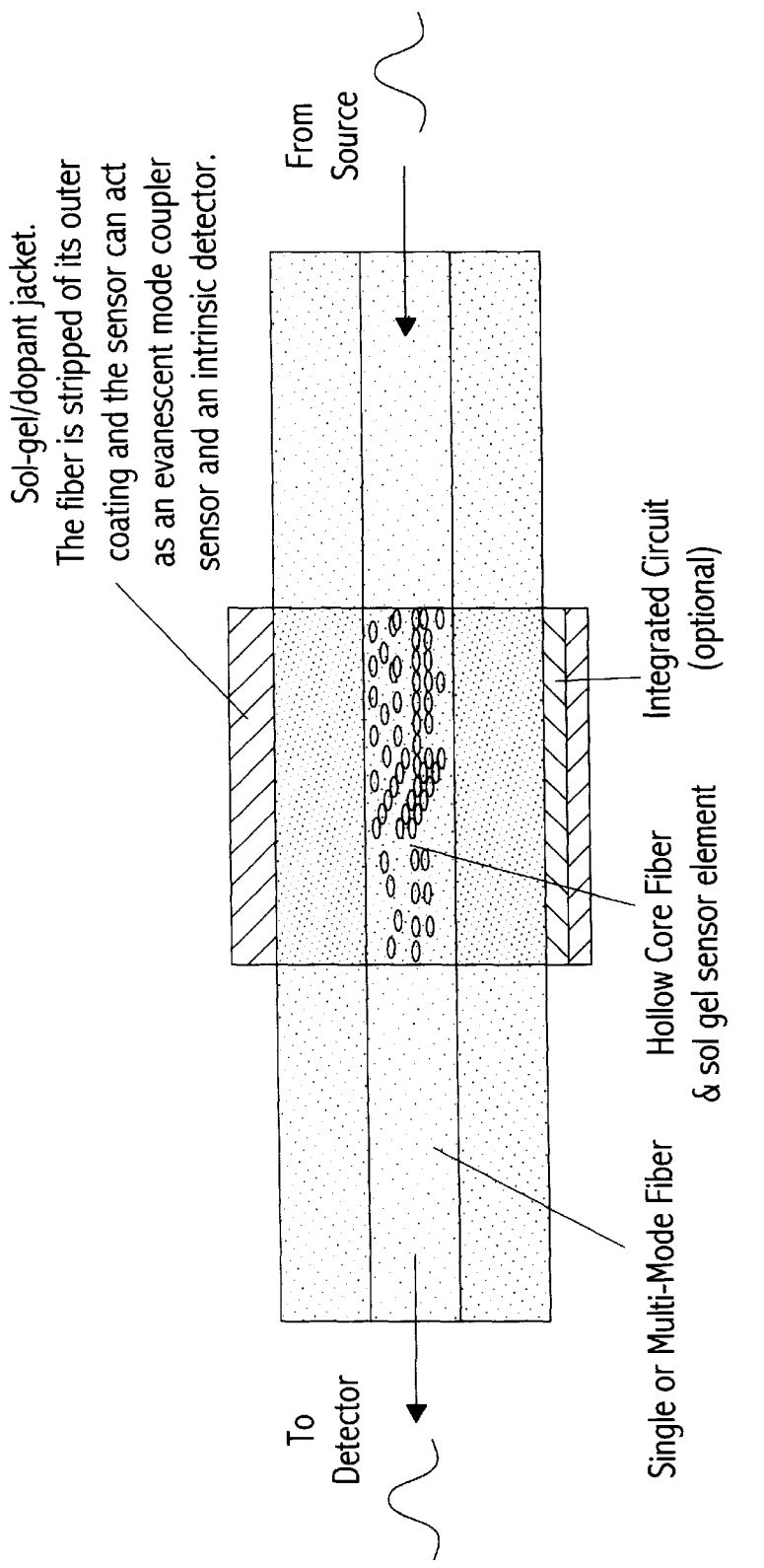
FIG. 11 illustrates Passive In-line, Integrated sol-gel Fiber Optic Sensor with sol gel jacket according to an exemplary embodiment of the invention.
Figure 12:
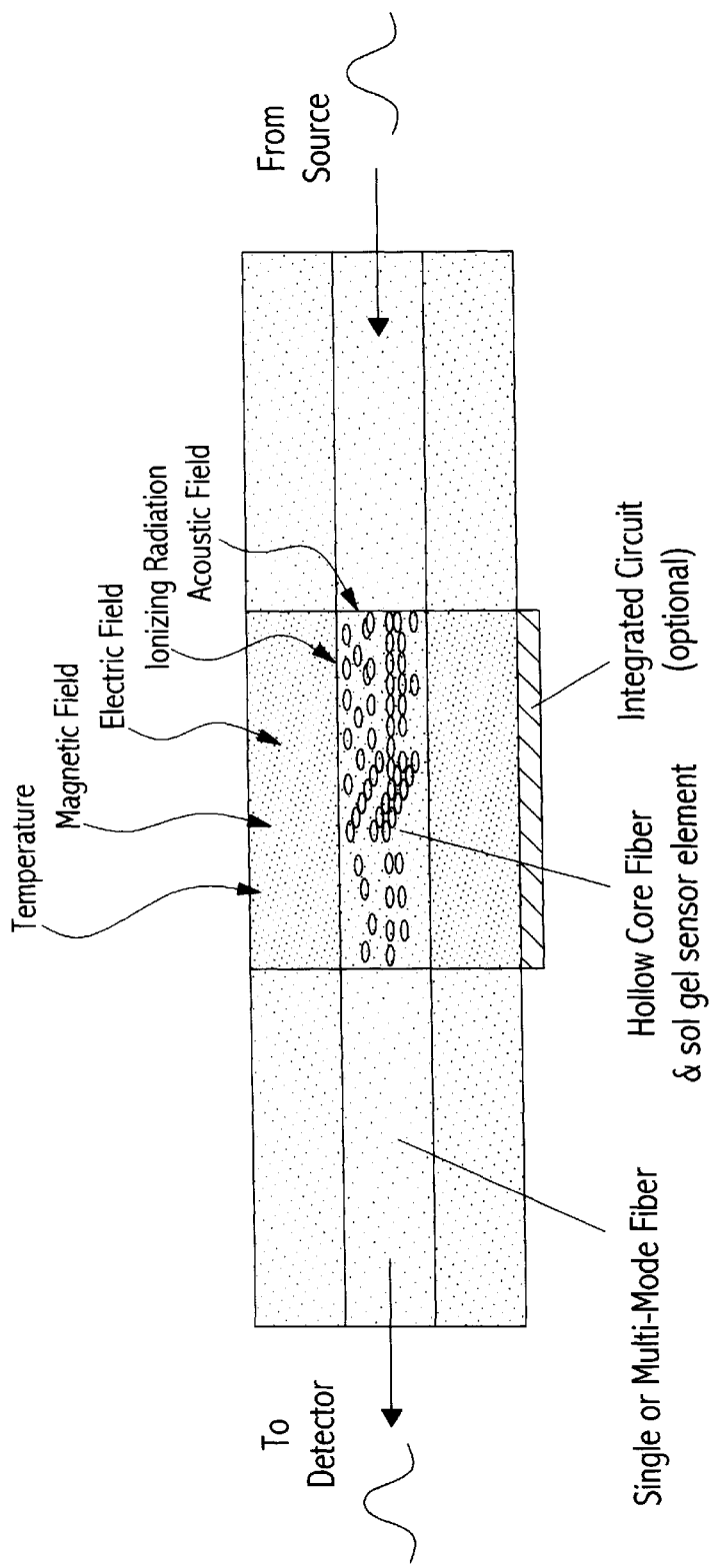
FIG. 12 illustrates Excited Emission In-line, Integrated sol-gel Fiber Optic Sensor according to an exemplary embodiment of the invention.
Figure 13:
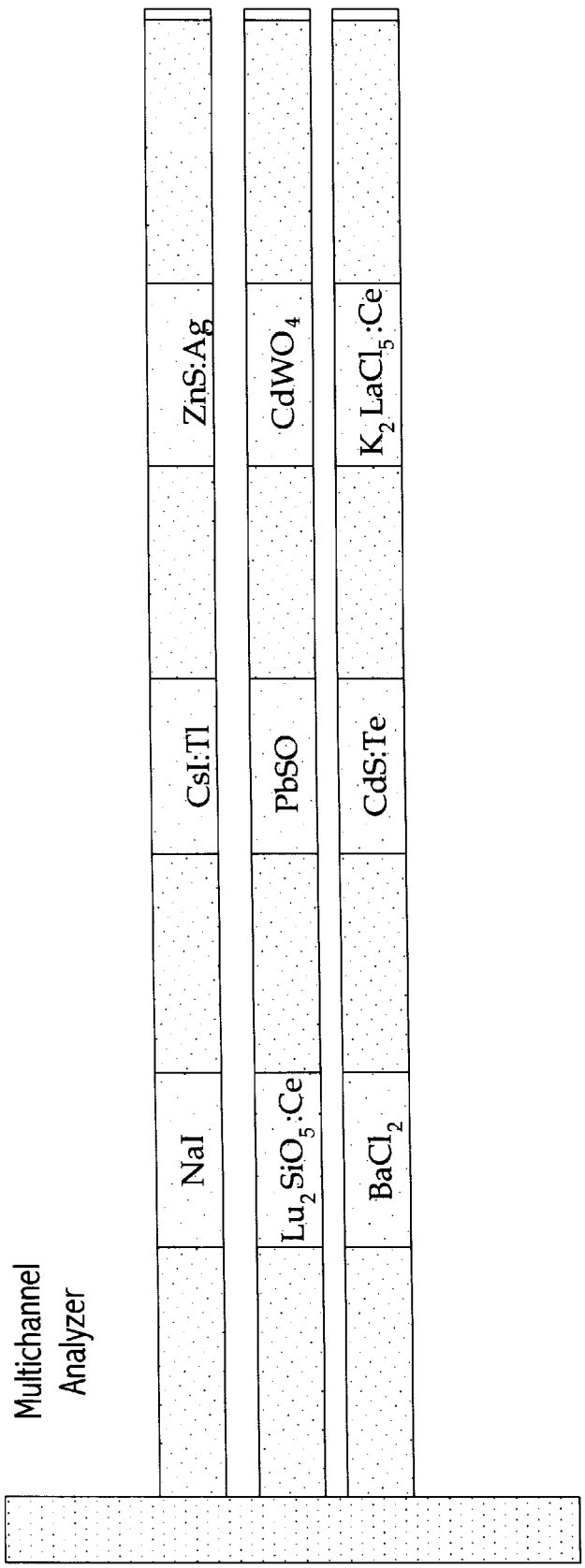
FIG. 13 illustrates Distributed Radiation Sensor using array of Passive In-Line, Integrated sol-gel Fiber Optic Sensors according to an exemplary embodiment of the invention.
Figure 14:
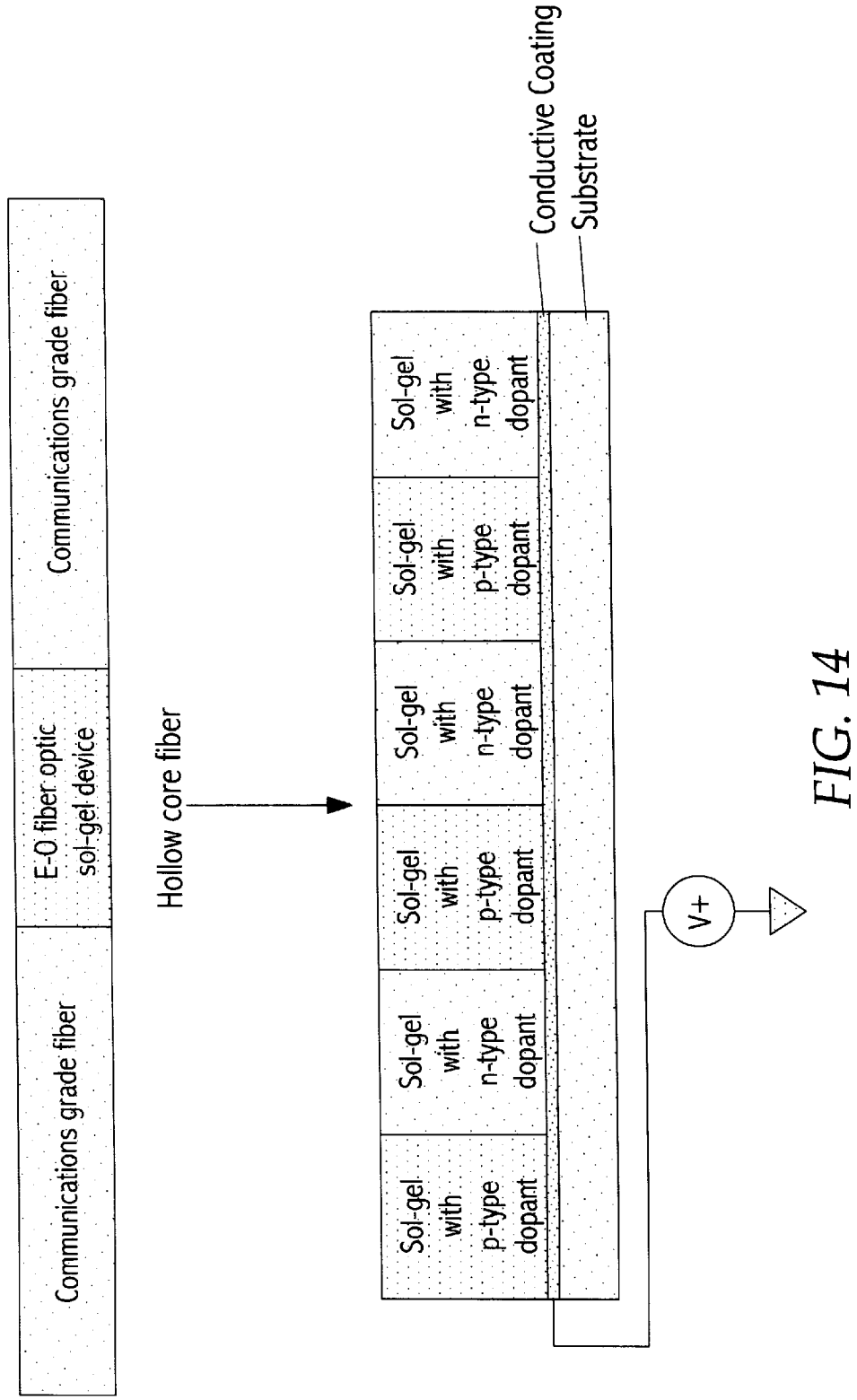
FIG. 14 illustrates Integrated Fiber Optic Sol-gel electro-optic device according to an exemplary embodiment of the invention.
Figure 15:
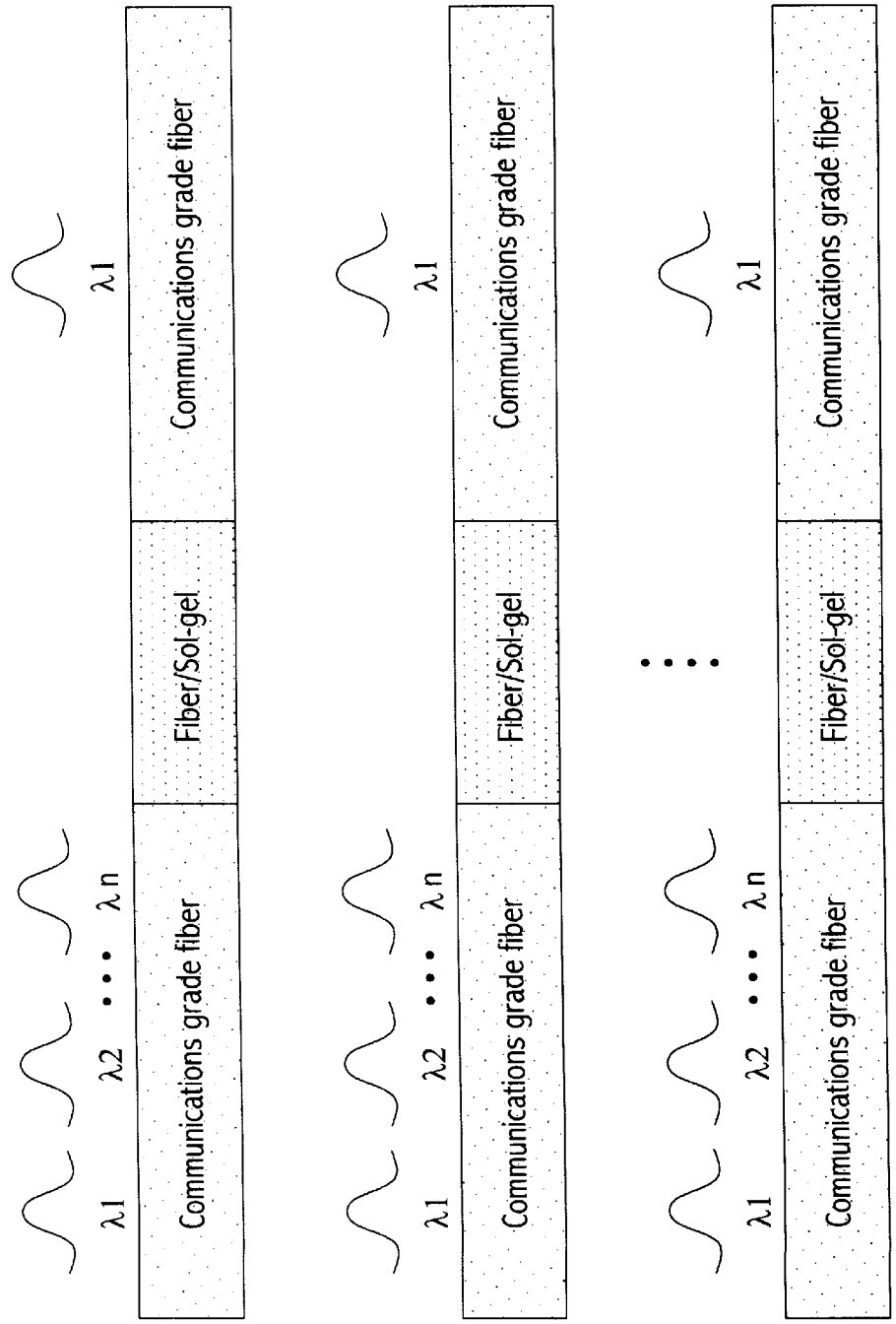
FIG. 15 illustrates Integrated fiber optic sol-gel device as a wavelength demultiplexer.

FIG. 4 illustrates a Passive Single Ended, Integrated Sol Gel Fiber Optic Sensor, sol gel/cavity according to an exemplary embodiment of the invention. FIG. 5 illustrates Excited Emission Single Ended, Integrated Sol Gel Fiber Optic Sensor, sol gel/cavity according to an exemplary embodiment of the invention. FIG. 6 illustrates a Passive Single Ended, Integrated Sol Gel Fiber Optic Sensor with sol gel jacket with a sol-gel substrate encapsulating a sol-gel core fiber according to an exemplary embodiment of the invention. FIG. 7 illustrates Excited Emission Single Ended, Integrated Sol Gel Fiber Optic Sensor with sol gel jacket according to an exemplary embodiment of the invention. FIG. 8 illustrates Passive Single Ended, Integrated sol-gel Fiber Optic Sensor, sol-gel/cavity with sol-gel jacket according to an exemplary embodiment of the invention. FIG. 9 illustrates Excited Emission Single Ended, Integrated sol-gel Fiber Optic Sensor, sol-gel cavity with sol-gel jacket according to an exemplary embodiment of the invention. FIG. 10 illustrates Passive In-line, Integrated sol-gel Fiber Optic Sensor according to an exemplary embodiment of the invention. FIG. 11 illustrates Passive In-line, Integrated sol-gel Fiber Optic Sensor with sol gel jacket according to an exemplary embodiment of the invention. FIG. 12 illustrates Excited Emission In-line, Integrated sol-gel Fiber Optic Sensor according to an exemplary embodiment of the invention. FIG. 13 illustrates Distributed Radiation Sensor using array of Passive In-Line, Integrated sol-gel Fiber Optic Sensors according to an exemplary embodiment of the invention. FIG. 14 illustrates Integrated Fiber Optic Sol-gel electro-optic device according to an exemplary embodiment of the invention. FIG. 15 illustrates Integrated fiber optic sol-gel device as a wavelength demultiplexer.

As described above, a sensor is fabricated for use as a luminescent element. Sensing of compounds via luminescence of dopants in the sol-gel is accomplished. Optical and electro optical devices, such as wavelength division multiplexers, and other devices, as part of fiber optic and optical networks can be produced by the exemplary process as well. A family of sensors can be produced, custom doped for various applications in the field of fiber optic sensors. A device according to an exemplary embodiment of the invention is useful for optical communications and other optical signal processing applications, such as wavelength division multiplexing, optical bandpass and bandstop filtering, and amplification.

Since fiber optics are lightweight, EMI immune, and passive, they are excellent candidates for a variety of newly emerging applications such as smart sensors. Smart sensors are embedded in a structure (e.g. aircraft fuselage) and can allow for online real time health monitoring of the structure. Other applications of devices made according to the invention include chemical sensing, stress monitoring, pressure sensing, and temperature sensing in the fields of biomedical monitoring and smart structures, for example. A sensor for passive sensing, e.g., chemi-luminescence sensing, or active sensing, e.g., laser excited luminescence sensing, can be produced.

A sensor produced according to an exemplary embodiment of the invention can be combined with other forms of fiber optic sensing, including strain, temperature, electromagnetic vibration, acoustic, for example.

Another exemplary embodiment of the invention takes advantage of the faraday effect by converting sol-gel to a faraday glass for magneto-optical and electro-optical devices.

In another embodiment of the invention, doping with scintillating halides enables radiation detection of x-rays, gamma rays, low energy electrons, protons, or alpha-particles, for example.

Characteristic materials to be used in scintillating detectors include:

NaI:Tl

CsI:Tl

CsI:Na $Lu_2SiO_5$:Ce $Y_2Al_5O_{12}$:Ce $Y_2SiO_5$:Ce

ZnS:Ag

NaI $PbSO_4$ $Bi_4Ge_3O_{12}$

CdWO$_4$
K$_2$LaCl$_5$:Ce
BaCl$_2$
CdS:Te

Sol-gels will provide a stable substrate and integrating them into a single system will provide a capable of radiation detection over a wide range of energies along a single fiber or a compact fiber bundle. The doping levels will typically range from a 100 ppm to 1–10% as shown in FIG. 13.

Another exemplary application of the invention is use as a detector in a countermeasure against laser attacks or laser surveillance against troops, equipment, or C$^3$I infrastructure, for example. The invention thus has applications in arms control and monitoring.

Advantages of the exemplary fiber optics devices include immunity to electromagnetic interference and jamming, radiation hardening capabilities, the provision of sensing and communications on the same medium, high speed and wide bandwidth, the ability to provide secure point to point links, and lightweight configuration, requiring low power and occupying very little space, which can be used covertly.

Additional advantages of an integrated fiber optic sol-gel sensor include speed because the electric dipole transitions can produce radiative decays on the order of a few nanoseconds. Sub-nanosecond decays can be achieved with materials such as BaF$_2$ via core-valence transitions, for example.

An integrated fiber optic sol-gel radiation sensor allows for fast detection times and detection of fast radiative emissions. Because the emission occurs in the waveguide, most of the photons can be transmitted directly to a detector.

According to another exemplary embodiment of the invention, chemical and biological sensing is achieved. The exemplary process according to the invention is highly compatible with sensitive biological materials because of the benign temperatures and conditions.

Analysis of biochemical systems via chemi-luminescence (CL) and bioluminescence (BL) is a major activity. The integrated fiber optic sol gel sensor takes advantage of the advances in this form analysis. Sol-gel can be doped with the appropriate CL or BL reagent. The resulting fluorescence takes place directly at the fiber optic interface for providing for maximum signal transfer.

According to an embodiment of the invention, fluorescent transitions of alkaline phosphatase reactions can be monitored by the integrated fiber optic sol-gel sensor according to an exemplary embodiment of the invention. Phosphatase activity measurements are very important in cell biology and medicine for example in the detection of cancer and biochemical processes in cells. There are very sensitive methods for the detection of phosphatases. An advantage of an optical fiber sensor is that the volume of enzyme and substrate containing fluid solution needed for analysis can be smaller than in the other techniques. This is important because the substrates are very expensive. Also, the sensor is very small and disposable. A sensor can be manufactured as a miniature disposable element mechanically connected to the optical fiber. The alkaline phosphatase reaction can be monitored by doping the sol-gel with fluorescein di-phosphate and adamantyl 1,2 dioxetane aryl phosphate as two examples. FIGS. 2 and 4 are typical configurations of sensor for this application.

Fiber optics filled with sol-gel can be used in a variety of industries. These include automotive as sensors in engines and for "intelligent" highways; communications to speed up transfer of data and information; environmental for real-time monitoring of toxic compound emissions; food for quality control of food constituents; manufacturing in control systems and sensors. within extreme environments; and in medicine in vitro diagnostics of physiological analytes, monitoring blood constituents, drug dosage/concentrations, and other body chemistry, for example.

Once an optical fiber element is fabricated successfully, the element can be spliced to an appropriate fiber(s), e.g., multimode or single mode fibers, or attached to an integrated optical substrate or other photonic device.

Communications and sensing are realized in the same fiber. Sol-gel material is successfully polymerized without cracks into a solid monolith, such that it can propagate an optical signal similar to that of a optical fiber waveguide. The figures referred to above illustrate a crack-free monolith inside a hollow core fiber according to an exemplary embodiment of the invention.

The doped sol-gel serves as both detection medium and waveguide. Scintillation in the waveguide confines the emitted photons to the waveguide. Other sol-gel fiber optic sensors disadvantageously depend upon evanescent coupling through the cladding of the fiber. By fabricating a doped core, the sensor element and the waveguide core are the same, which allows light to be guided to the detection equipment without evanescent coupling.

A sol-gel substrate encapsulating a sol-gel core fiber device may be made according to an exemplary embodiment of the invention. In this case, a doped sol-gel core containing fiber, made according to the above-described methods, is subsequently encapsulated in a doped sol-gel layer, so that doped sol-gel is present inside and outside the fiber. FIG. 6 illustrates a Passive Single Ended, Integrated Sol Gel Fiber Optic Sensor with sol gel jacket with a sol-gel substrate encapsulating a sol-gel core fiber according to an exemplary embodiment of the invention.

The table below cross references the types of sensors to the appropriate configuration. The dopants have been previously described and new dopants are being tested on a regular basis. There are thousands of possible dopant combinations.

| Sensor | FIG.(s) |
|---|---|
| chemical sensor | 2–12 |
| fiber optic sensor | 1–15 |
| luminescent device | 2–9 |
| electro optical device | 12, 14 |
| biochemical sensor | 2–12 |
| radiation sensor | 13 |
| temperature sensor | 10 |
| biological sensor | 2–12 |
| laser-activated sensor | 3, 5, 7, 9 |
| acoustic sensor | 10, 11, 12 |
| electromagnetic sensor | 10, 11, 12 |
| Electric field sensor | 7–12 |
| optical device | 14, 15 |
| electro optical device | 12, 14, 15 |
| faraday effect | 12 |
| scintillating compound | 2, 3, 6–13 |
| laser detection device | 3, 5, 7, 9, 13 |
| fiber optic waveguide | 2, 3, 6–15 |
| particle detection device | 13 |
| phosphatase activity sensor | 2–9 |
| quality control of food constituents sensor | 2–9 |
| medical sensor | 2–9 |
| hazardous gas detector | 2–12 |
| integrated sensor reaction platform for biochemistry and analytical chemistry | 2–9 |
| real-time monitoring of toxic compounds | 2–9 |
| sensor for real–time monitoring of radiation emissions | 13 |

| Sensor | FIG.(s) |
|---|---|
| single-ended device | 2–9 |
| in-line device | 10–15 |
| encapsulating sol-gel layer formed on the outer surface of the fiber | 6–9, 11 |

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components, and/or process steps, may have been mentioned herein which can be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A fiber device, comprising:
    a hollow core fiber, said hollow core fiber having an inner and outer surface; and
    sol-gel material inside said hollow core fiber,
    wherein the sol-gel material is doped with a dopant.

2. The fiber device according to claim 1, wherein the fiber device comprises a fiber optic sensor.

3. The fiber device according to claim 2, wherein the fiber optic sensor comprises a luminescent device when doped with a luminescent material.

4. The fiber device according to claim 1, wherein the fiber device comprises an electro optical device when doped with E-O active materials such as terbium-gallium.

5. The fiber device according to claim 1, wherein the fiber device comprises a biochemical sensor when doped with chemi-luminescence (CL) and bioluminescence (BL) materials.

6. The fiber device according to claim 1, wherein the fiber device comprises a radiation sensor when doped with scintillating compounds.

7. The fiber device according to claim 1, wherein the fiber device comprises a temperature sensor when doped with thermoluminescent materials.

8. The fiber device according to claim 1, wherein the fiber device comprises a biological sensor when doped with chemi-luminescence (CL) and bioluminescence (BL) materials.

9. The fiber device according to claim 1, wherein the fiber device comprises a laser-activated sensor when doped with chemi-luminescence (CL) or electroluminescent (EL) materials.

10. The fiber device according to claim 1, wherein the fiber device comprises an acoustic sensor when doped with acousto-optic materials.

11. The fiber device according to claim 1, wherein the fiber device comprises an electromagnetic sensor when doped as a faraday glass.

12. The fiber device according to claim 1, wherein the fiber device comprises an electric field sensor when doped as faraday glass and/or calcofluor.

13. The fiber device according to claim 1, wherein the fiber device comprises an optical device.

14. The fiber device according to claim 13, wherein the optical device comprises one of:
    a wavelength division multiplexer/demultiplexer;
    an optical bandpass filter;
    an optical bandstop filter;
    an optical switch;
    an optical isolator; or
    an optical amplifier.

15. The fiber device according to claim 1, wherein the fiber device comprises an electro-optical device in combination with an electronic device.

16. The fiber device according to claim 1, wherein the fiber device comprises a faraday effect device.

17. The fiber device according to claim 1, wherein the fiber device dopant comprises a scintillating compound.

18. The fiber device according to claim 1, wherein the fiber device comprises a laser detection device.

19. The fiber device according to claim 1, wherein the fiber device comprises a fiber optic waveguide.

20. The fiber device according to claim 19, wherein the fiber device further comprises a sensing device.

21. The fiber device according to claim 1, wherein the fiber device dopant comprises a luminescent material.

22. The fiber device according to claim 1, wherein the fiber device comprises a particle detection device.

23. The fiber device according to claim 1, wherein the fiber device dopant comprises at least one protein.

24. The fiber device according to claim 1, wherein the fiber device dopant comprises at least one enzyme.

25. The fiber device according to claim 1, wherein the fiber device comprises a solvent-resistant device.

26. The fiber device according to claim 1, wherein the fiber device comprises a phosphatase activity sensor.

27. The fiber device according to claim 1, wherein the hollow core fiber has a diameter of approximately 10 $\mu$m.

28. The fiber device according to claim 1, wherein the fiber device dopant comprises calcofluor.

29. The fiber device according to claim 1, wherein the fiber device dopant comprises fluorescein or any member of the class of fluoresceins.

30. The fiber device according to claim 1, wherein the fiber device comprises a quality control of food constituents sensor.

31. The fiber device according to claim 1, wherein the fiber device comprises a medical sensor, for sensing at least one of:
    in vitro diagnostics of physiological analytes;
    drug concentrations; and
    other body chemistry.

32. The fiber device according to claim 1, wherein the fiber device comprises a hazardous gas detector.

33. The fiber device according to claim 1, wherein the fiber device comprises an integrated sensor reaction platform for biochemistry and analytical chemistry.

34. The fiber device according to claim 1, wherein the fiber device comprises a sensor for real-time monitoring of toxic compounds.

35. The fiber device according to claim 1, wherein the fiber device comprises a sensor for real-time monitoring of radiation emissions.

36. The fiber device according to claim 1, wherein the fiber device comprises a single-ended device.

37. The fiber device according to claim 1, wherein the fiber device comprises an in-line device.

38. The fiber device according to claim 1, wherein the fiber device further comprises an encapsulating sol-gel layer formed on the outer surface of the fiber.

39. The fiber device according to claim 1, further comprising means for providing a cavity between said inner surface of said hollow fiber and said sol-gel material.

40. The fiber device according to claim 1, wherein a first end of the fiber device is open ended.

41. The fiber device according to claim 1, further comprising sol-gel material on the outer surface said hollow core fiber.

42. The fiber device according to claim 1, further comprising:

a first optical fiber operatively connected to a first end of said hollow core fiber; and a second optical fiber operatively connected to a second end of said hollow core fiber.

43. The fiber device according to claim 42, further comprising sol-gel material coated on said outer surface of said hollow core fiber.

44. The fiber device according to claim 42, further comprising an integrated circuit attached to said outer surface of said hollow core fiber.

\* \* \* \* \*